(12) United States Patent
Syndikus

(10) Patent No.: US 8,033,379 B2
(45) Date of Patent: Oct. 11, 2011

(54) CROSS BELT SORTER AND METHOD FOR TRANSPORTING AND SORTING PIECE GOODS

(75) Inventor: Andreas Syndikus, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 570 days.

(21) Appl. No.: 12/229,957

(22) Filed: Aug. 28, 2008

(65) Prior Publication Data

US 2009/0057100 A1   Mar. 5, 2009

(30) Foreign Application Priority Data

Aug. 29, 2007 (DE) .................. 10 2007 040 859

(51) Int. Cl.
*B65G 47/46* (2006.01)
(52) U.S. Cl. ................................................. 198/370.06
(58) Field of Classification Search ............... 198/370.1, 198/371.1, 370.06
See application file for complete search history.

(56) References Cited

U.S. PATENT DOCUMENTS

| | | | | | |
|---|---|---|---|---|---|
| 3,912,071 | A | * | 10/1975 | Nielsen | 198/370.06 |
| 4,781,281 | A | * | 11/1988 | Canziani | 198/370.06 |
| 4,884,676 | A | * | 12/1989 | Suizu | 198/370.06 |
| 5,701,992 | A | * | 12/1997 | Enomoto | 198/370.06 |
| 5,803,230 | A | * | 9/1998 | Canziani et al. | 198/370.06 |
| 6,571,933 | B1 | * | 6/2003 | Gortz et al. | 198/370.06 |
| 6,938,750 | B2 | * | 9/2005 | Miller et al. | 198/370.06 |
| 7,080,725 | B2 | * | 7/2006 | Hishinuma | 198/370.06 |

FOREIGN PATENT DOCUMENTS

| | | |
|---|---|---|
| DE | 198 01 706 A1 | 7/1999 |
| EP | 0 990 604 A1 | 4/2000 |
| JP | 06191635A A | 7/1994 |
| JP | 2006044818 A | 2/2006 |

\* cited by examiner

*Primary Examiner* — James R Bidwell

(57) ABSTRACT

Disclosed is a method and a cross belt sorter for transporting and sorting piece goods, having a plurality of carriages either coupled on a continuous conveyor track to form a train or moved individually, where piece goods are transported in a resting position and loaded and/or unloaded at fixed loading and/or unloading locations, a cross belt which circulates continuously around a plurality of deflection rollers and is driven transversely with respect to the direction of transportation of the carriages, wherein the cross belt drives the carriages, where a deflection roller of the cross belt corresponding to a drive whose drive force is derived from the longitudinal movement of the cross belt sorter, and a shiftable transmission arranged between the drive of the cross belt and the deflection roller, where a drive shaft of the transmission is continuously engaged with the drive and the transmission connecting the deflection roller to the drive is engageable and disengageable.

18 Claims, 1 Drawing Sheet

CROSS BELT SORTER AND METHOD FOR TRANSPORTING AND SORTING PIECE GOODS

CROSS REFERENCE TO RELATED APPLICATIONS

This application claims the benefits of German application No. 10 2007 040 859.7 filed Aug. 29, 2007 and is incorporated by reference herein in its entirety.

FIELD OF INVENTION

The invention relates to a cross belt sorter and to a method for transporting and sorting piece goods, composed of a plurality of carriages which are coupled on a continuous conveyor track to form a train or can be moved individually and which are themselves each provided with a cross belt which circulates continuously around deflection rollers and can be driven transversally with respect to the direction of transportation of the carriages, and on which the objects can be transported in a resting position and loaded and/or unloaded at fixed loading and/or unloading locations, for which purpose at least one deflection roller of the cross belt corresponds to a drive whose drive force is derived from the longitudinal movement of the cross belt sorter.

BACKGROUND OF THE INVENTION

What are referred to as cross belt sorters are known from piece goods conveyor technology, in particular sorting technology, and are composed of vehicles which can be moved on a conveyor system, usually a plurality of which vehicles are joined to form a train or a chain of carriages which circulates continuously. The individual vehicles are provided with carrier belts, which can be driven so that they circulate transversely with respect to the direction of transportation of the vehicles. On this carrier belt, also referred to as a cross belt, the piece goods are conveyed in the longitudinal direction of the conveyor with the cross belt in the stationary state, and for the purpose of sorting at the desired unloading location the piece goods are discharged laterally through controlled driving of the cross belt transversely with respect to the direction of transportation of the cross belt conveyor.

In order to activate the described discharging process, a drive for the cross belt, which can be activated at least at the unloading and/or loading location, has to be provided on each carriage of the moving chain of carriages of the cross belt sorter.

Various drives are known for this purpose. It is very widespread practice to implement the drive with electric motors which are carried along on each carriage and which tap their power via contact collector lines laid along the conveyor track or inductively (EP 0 990 604 A1).

It is also known to use the propulsion of the chain of carriages itself to activate the discharging of goods. In this context, for example a shiftable connector link is connected by means of a press fit to a friction wheel by means of which the discharging process is initiated at the unloading location as the chain of carriages passes by (DE 198 01 706 A1).

An electric motor for activating the drive for the cross belt must be capable of discharging piece goods up to a weight of 50 kg with an acceleration of up to 3 m/s². The power required for this has to be transmitted to the moving chain of carriages via contact collector lines or in a contactless fashion; in addition, the information as to when the respective cross belt is to be moved must also be transmitted to the moving chain of carriages. A considerable degree of expenditure is therefore necessary and this makes the device significantly more expensive and susceptible to faults.

If the cross belt is activated mechanically, it has been found that the operative principle functions reliably only up to a speed of 1.6 m/s because the jolting acceleration of the cross belt which is induced by the friction wheel has an adverse effect on the discharging behavior, in particular in the case of lightweight consignments. For this reason, sorting speeds up to 2.5 m/s have previously been implemented with an electric drive.

SUMMARY OF INVENTION

Taking the described problems and disadvantages of the prior art as a starting point, the present invention is based on the object of improving a generic cross belt sorter in such a way that a simple and economical drive of the cross belt can be used to generate a sufficiently large force at the desired unloading location to discharge even heavy objects at a high discharging speed without damaging them.

In order to achieve the object, according to the invention a cross belt sorter of the generic type with a mechanical drive is improved by virtue of the fact that a shiftable transmission is provided between the drive of the cross belt and the deflection roller, which transmission connects the deflection roller to the drive in an engageable and disengageable fashion.

The propulsion of the sorter is used, initially as in the prior art, to implement the necessary drive of the cross belt for the discharging movement. For this purpose, the drive force is generated, for example, by virtue of the fact that at least one friction wheel which is attached to each carriage of the cross belt conveyor rolls on the sorter frame as the carriage is propelled, which friction wheel passes on its rotation to the deflection roller at the correct time via a shaft and an engageable transmission.

A compact, space-saving arrangement is achieved by the invention in that the shiftable transmission is arranged inside the hollow deflection roller.

It is particularly advantageous if, according to a further feature of the invention, the transmission can be shifted in a contactless fashion. As a result of this proposal, costly mechanical shifting elements or electrical feeder lines are dispensed with, which is advantageous in particular if the transmission is arranged within the deflection roller in accordance with the invention.

The transmission can be, for example, a multi-disk clutch which can be actuated from outside the deflection roller and, depending on the shifting process, connects the drive to the deflection roller or disconnects it from it. The multi-disk clutch can preferably be actuated magnetically.

In one particularly favorable refinement, the transmission is a shiftable planetary gear mechanism. Such a planetary gear mechanism is particularly suitable for installation in the deflection roller and given a relatively high production numbers it is also more economical than the known electric motors on each deflection roller, especially since the problem of feeding in power and transmitting data to the moving chain of carriages is eliminated.

In one preferred refinement of the invention, the sun gear of the planetary gear mechanism is arranged on the drive shaft which is coaxial to the deflection roller and is connected to the drive; the planetary gears which are mounted in the freely rotatable planetary annulus mesh, on the one hand, with the sun gear and, on the other hand, with the ring gear of the planetary gear mechanism which is attached to the inner circumference of the deflection rollers. In this way, a particularly compact and functional drive is provided which can be manufactured easily and can be mounted simply.

In order to permit the transmission to be shifted, according to the invention the planetary annulus of the planetary gears can be controlled from outside the deflection roller and locked temporarily. The temporary locking capability of the planetary annulus is important for ensuring the functionality of the shifting capability of the planetary gear mechanism. If, in fact, the planetary annulus is locked, the planetary gears are made to rotate by the sun gear owing to the locomotion of the carriages, said sun gear itself being in continuous engagement with the friction drive on the sorter frame. Since the planetary gears are meshed simultaneously with the ring gear which is arranged in the interior of the deflection roller, said ring gear is driven. By means of the ring gear which is connected to the deflection roller, the cross belt which rests on the deflection roller is driven in the rotational direction of the deflection roller, and objects resting on the cross belt are discharged transversely with respect to the direction of transportation of the cross belt conveyor.

In one particular refinement of the invention there is provision that the planetary annulus of the planetary gears is permanently connected to a hollow shaft which coaxially engages around the drive shaft centrally in the interior of the deflection roller and is rotatably mounted on said drive shaft. The drive shaft which is driven coaxially with respect to the deflection roller is in continuous operative engagement with the friction wheel on the frame of the cross belt sorter, but it passes on the rotation to the deflection roller only if the transmission is shifted between the deflection roller and drive shaft. Unless the transmission is engaged, the hollow shaft and the planetary annulus, with the planetary gears arranged in it, rotate about the drive shaft without transmitting the rotational movement to the deflection roller. This is not made possible until the hollow shaft is secured so that the planetary gears which are driven by the sun gear pass on the drive force to the ring gear in the interior of the deflection roller.

A particularly favorable arrangement is obtained if, according to one feature of the invention, the hollow shaft is provided with at least one permanent magnet which is attached to its circumference and which is located in the effective range of an electromagnet which is provided outside the deflection roller, and when the magnetic field is switched on said permanent magnet causes the hollow shaft and therefore the planetary annulus to be secured. As a result, the planetary gears set the ring gear in motion and therefore at the same time set in motion the deflection roller with the cross belt resting on it. In this way, the hollow shaft is stopped, and therefore the transmission shifted, in a contactless fashion and easily by switching the electromagnet from outside the deflection roller.

According to one refined feature of the invention, the strength of the magnetic field can advantageously be varied. Adjustment of the magnetic field makes it possible to brake and accelerate the cross belt gently, therefore permitting a gentle goods-feeding-in and discharging process even at otherwise high transportation speeds.

In order to implement loading and unloading of the cross belt conveyor on both sides of the conveyor, the cross belt should be reversible. This is achieved according to the invention in that each of the two deflection rollers is assigned a transmission according to the invention which can be driven in the respectively reversed rotational sense.

The method according to the invention for driving an abovementioned cross belt sorter for transporting and sorting objects provides that, in order to load or unload the cross belt sorter, the drive shaft which is continuously in engagement with the drive is temporarily connected to the deflection roller, having been shifted from the outside, and as a result the cross belt can be set in motion in the rotational direction of the deflection roller.

The sun gear which is arranged on the drive shaft and is continuously driven by it therefore brings about, when the planetary annulus is locked, a rotation of the ring gear by means of the planetary gears which mesh with the sun gear and with the ring gear and a rotation of the deflection roller since said ring gear is attached in the interior of the deflection roller. As a result, the cross belt which rests on the deflection roller is forcibly set in motion. As soon as the planetary annulus is released again as a result of the electromagnet being switched off, the electromagnet rotates with the hollow shaft about the sun gear or the drive shaft, and in this context the planetary gears which mesh simultaneously with the sun gear and the ring gear no longer conduct a drive force to the ring gear and the deflection roller and the cross belt which rests upon it comes to a standstill.

The drive principle according to the invention has significant advantages over the previously used technology. The power which is required for the discharging process is available to a sufficient degree by virtue of the speed of the sorter. The contactless operative principle for the activation of the discharging process places no restrictive demands on the speed of the sorter. By changing the strength of the magnetic field it is possible to implement an approximately uniform acceleration during the discharging process even at high speeds.

BRIEF DESCRIPTION OF THE DRAWINGS

An exemplary embodiment of the invention is illustrated in the drawing and will be described below.

In said drawing.

DETAILED DESCRIPTION OF INVENTION

Figure 1:
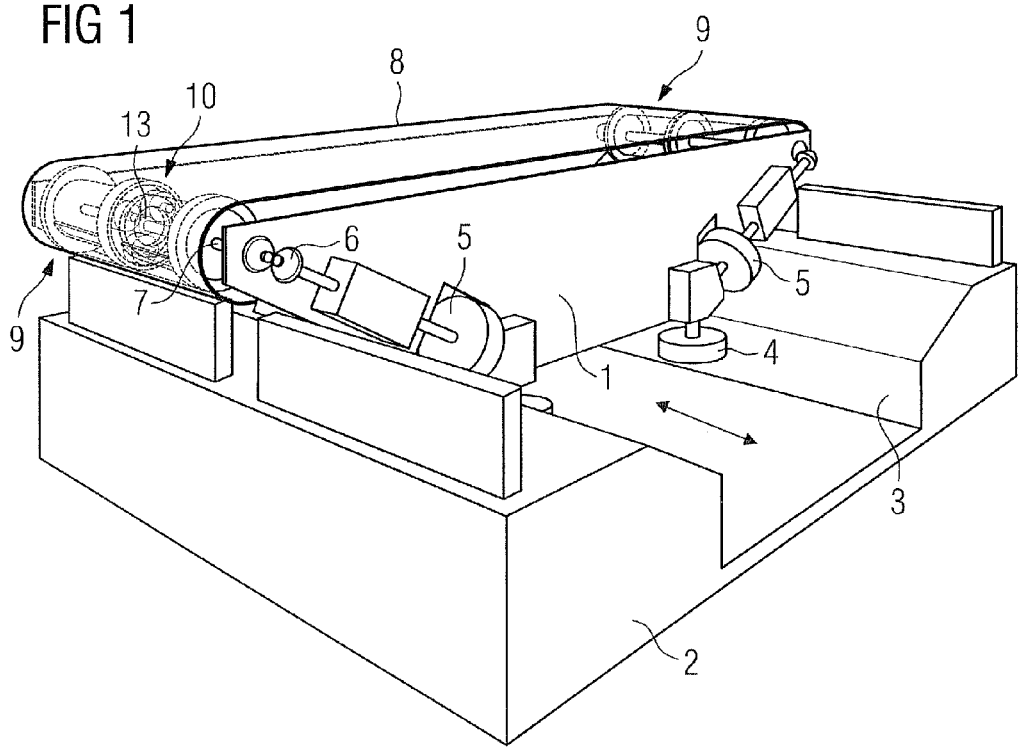
FIG. 1 is a roughly simplified illustration of the carriage of a cross belt conveyor according to the invention.

In FIG. 1, one of a plurality of carriages of a cross belt conveyor is denoted by 1, which carriage can be moved driven in the direction of the arrow on the frame 2 of the cross belt conveyor which is guided in a continuous loop. The cross belt conveyor may have any desired drive here. The individual carriages 1 of the cross belt conveyor can be coupled to one another to form a chain of carriages or to form a train or circulate individually in the direction of transportation. Deflection rollers 9, about which a continuous cross belt 8 is wound in the manner of a conveyor belt, are mounted on each carriage 1 on each side of the longitudinal axis of the cross conveyor and oriented in the direction of transportation. The deflection rollers 9 can be driven, to be precise with drive derived from the transportation movement of the cross belt conveyor. For this purpose, friction wheels 4, 5 are mounted on the carriage 1, said friction wheels 4, 5 bearing on friction faces 3 which run along the transportation path of the cross belt conveyor, and by rolling there when the carriages are transported pass on their rotational movement via a drive shaft to a bevel gear mechanism 6 which diverts the drive force to the drive shaft 7 for the cross belt.

The drive shaft 7 runs coaxially in the deflection roller 9, and in the center of the deflection roller said drive shaft 7 is fitted with the sun gear 13 of a planetary gear mechanism which is arranged entirely in the interior of the deflection roller 9.

Figure 2:
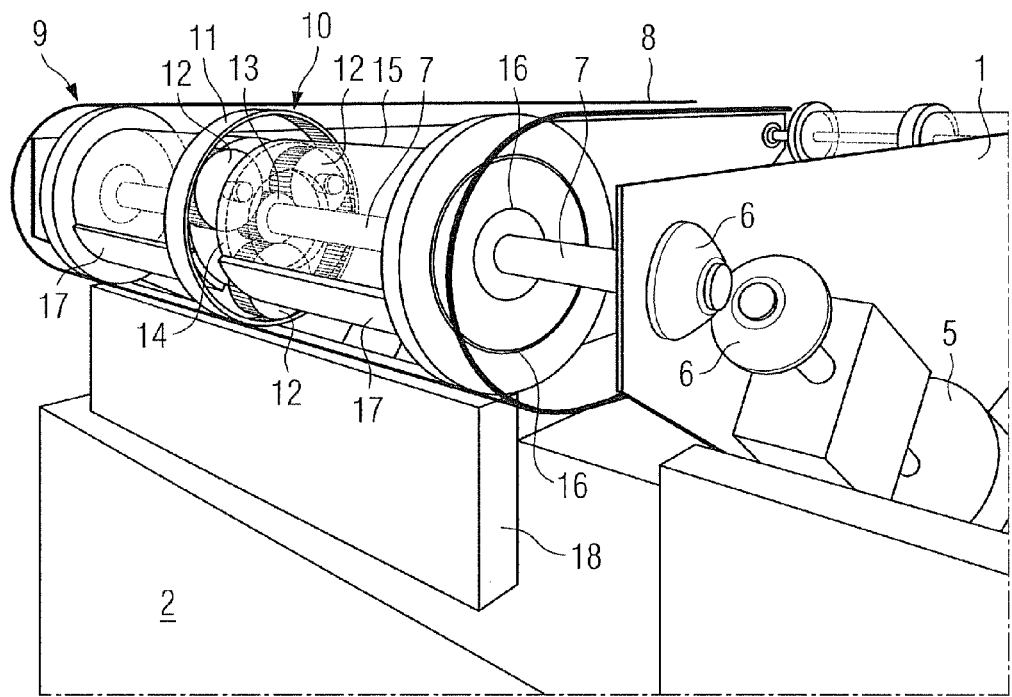
FIG. 2 is an enlarged illustration of the drive principle of the cross belt.

The drive of the deflection roller 9 is illustrated in an enlarged illustration in FIG. 2. It is possible to see that the ring gear 11 of the planetary gear mechanism 10 is attached coaxially to the deflection roller 9 on the inside of said deflection roller 9 and can be driven by means of the three planetary gears 12 which mesh with the sun gear 13. The planetary gears 12 are mounted in the planetary annulus 14 which is the end part of a hollow shaft 15 which engages coaxially around the drive shaft 7 and is rotatably mounted on it or in the deflection roller at 16. Permanent magnets 17, which correspond to an electromagnet 18 as soon as the latter is switched on, are arranged on the hollow shaft 15, preferably on the inner circumference. The electromagnet 18 is attached to the frame 2 of the cross belt conveyor, specifically in such a way that when the magnetic field is switched on the electromagnet 18 influences the permanent magnet 17 of the hollow shaft 15 in such a way that the hollow shaft 15 is prevented from rotating about the drive shaft.

This results in the following effect:

During locomotion of the carriage 1 in the direction of transport along the frame 2 of the cross conveyor, the friction wheels 4, 5 on the friction face 3 which is provided at least in the region of the loading and unloading locations are set in motion and transmit, via drive shafts, a torque which is deflected via the bevel gear mechanism 6 to the drive shaft 7 which is driven in the region of the friction face 3 during the entire locomotion of the carriage 1. The sun gear 13, which is permanently arranged on the drive shaft, also rotates with the drive shaft 7, and said sun gear 13 in turn sets in rotation the planetary gears 12, and via them the planetary annulus 14 in which the planetary gears are mounted. At the same time, the planetary gears 12 roll on the inner circumference of the toothed ring gear 11, in its circumferential direction. The ring gear 11 is stationary here as long as the planetary annulus 14 can rotate about the system axis of the planetary gear mechanism. The stationary state of the ring gear 11 means at the same time that the deflection roller 9, and therefore the cross belt 8 with the object resting on it, are also stationary, with the result that said object can be moved along in the direction of transportation.

The ring gear 11 is not driven in rotation by the planetary gears 12 meshing with the sun gear 10 until the planetary annulus 14 is locked, initiated by the switching on of the electromagnet 18 whose magnetic field holds the permanent magnet in the hollow shaft 15. The deflection roller 9, and therefore also the cross belt which is wrapped around the deflection rollers 9 of the carriage 1, move with the ring gear 11, transversely with respect to the direction of transportation of the cross belt conveyor, therefore permitting the carriage to be loaded or unloaded.

The invention claimed is:

1. A cross belt sorter for transporting and sorting piece goods, comprising:
    a plurality of carriages either coupled on a continuous conveyor track to form a train or moved individually, where piece goods are transported in a resting position and loaded and/or unloaded at fixed loading and/or unloading locations;
    a cross belt which circulates continuously around a plurality of deflection rollers and is driven transversely with respect to the direction of transportation of the carriages, wherein the cross belt drives the carriages, wherein
    at least one deflection roller of the cross belt corresponds to a drive whose drive force is derived from the longitudinal movement of the cross belt sorter; and
    a shiftable transmission arranged between the drive of the cross belt and the deflection roller, where a drive shaft of the transmission is continuously engaged with the drive and the transmission connecting the deflection roller to the drive is engageable and disengageable, wherein the transmission is arranged inside a hollow deflection roller.

2. The cross belt sorter as claimed in claim 1, wherein the transmission is shifted in a contactless fashion.

3. The cross belt sorter as claimed claim 2, wherein the transmission is an actuatable multi disk clutch.

4. The cross belt sorter as claimed in claim 3, wherein the multi disk clutch is actuated magnetically from the outside.

5. The cross belt sorter as claimed in claim 2, wherein the transmission is a shiftable planetary gear mechanism.

6. The cross belt sorter as claimed in claim 5, wherein a sun gear of the planetary gear mechanism is arranged on the drive shaft which is coaxial to the deflection roller and is connected to the drive, and a plurality of planetary gears mounted in a non driven planetary annulus mesh with respect to the sun gear and with the ring gear of the planetary gear mechanism which is attached to the inner circumference of the deflection roller.

7. The cross belt sorter as claimed in claim 6, wherein the planetary annulus of the planetary gears is temporarily lockable, under control from outside the deflection roller.

8. The cross belt sorter as claimed in claim 7, wherein the planetary annulus of the planetary gears is permanently connected to a hollow shaft that coaxially engages around the drive shaft of the drive centrally in the interior of the deflection roller and is rotatably mounted on the drive shaft.

9. The cross belt sorter as claimed in claim 8, wherein the hollow shaft is provided with at least one permanent magnet attached to the hollow shaft circumference and is located in the effective range of an electromagnet arranged outside the deflection roller, and when the magnetic field is switched on the permanent magnet causes the hollow shaft to be secured to the planetary annulus and brings about simultaneous rotation of the ring gear with the deflection roller.

10. The cross belt sorter as claimed in claim 9, wherein the strength of the magnetic field is variable.

11. The cross belt sorter as claimed in claim 10, wherein each of the plurality of deflection rollers is assigned a transmission which is drivable in a respectively reversed rotational sense.

12. A method for driving a cross belt sorter for transporting and sorting objects, comprising:
    providing a plurality of carriages that are either coupled on a continuous conveyor track to form a train or are moveable individually, where piece goods are transported in a resting position and loaded and/or unloaded at fixed loading and/or unloading locations;
    providing a cross belt which circulates continuously around a plurality of deflection rollers and is driven transversely with respect to the direction of transportation of the carriages, wherein the cross belt drives the carriages, wherein
    providing at least one deflection roller of the cross belt corresponding to a drive whose drive force is derived from the longitudinal movement of the cross belt sorter;
    providing a shiftable transmission arranged between the drive of the cross belt and the deflection roller, where a drive shaft of the transmission is continuously engaged with the drive and the transmission connecting the deflection roller to the drive is engageable and disengageable; and temporarily disconnecting the drive shaft from the deflection roller in order to load or unload the cross belt sorter;

reconnecting the drive shaft to the deflection roller to set the cross belt in motion in the rotational direction of the deflection roller, wherein the transmission is arranged inside a hollow deflection roller.

13. The cross belt sorter as claimed in claim 12, wherein the transmission is shifted in a contactless fashion.

14. The cross belt sorter as claimed claim 13, wherein the transmission is an actuatable multi disk clutch.

15. The cross belt sorter as claimed in claim 14, wherein the multi disk clutch is actuated magnetically from the outside.

16. The cross belt sorter as claimed in claim 13, wherein the transmission is a shiftable planetary gear mechanism.

17. The cross belt sorter as claimed in claim 16, wherein a sun gear of the planetary gear mechanism is arranged on the drive shaft which is coaxial to the deflection roller and is connected to the drive, and a plurality of planetary gears mounted in a non driven planetary annulus mesh with respect to the sun gear and with the ring gear of the planetary gear mechanism which is attached to the inner circumference of the deflection roller.

18. The method as claimed in claim 17, wherein the planetary annulus of the planetary gears is temporarily lockable, under control from outside the deflection roller.

* * * * *